US009279516B2

(12) United States Patent
Lin et al.

(10) Patent No.: US 9,279,516 B2
(45) Date of Patent: Mar. 8, 2016

(54) FLUID REGULATOR WITH BALANCNIG SYSTEM (71) Applicant: EMERSON PROCESS MANAGEMENT REGULATOR TECHNOLOGIES, INC., McKinney, TX (US)

(72) Inventors: Chun Lin, McKinney, TX (US); Alexandru Gaal, Cluj-Napoca (RO); Horatiu P. Tripon, Cluj-Napoca (RO)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 164 days.

(21) Appl. No.: 14/202,957

(22) Filed: Mar. 10, 2014

(65) Prior Publication Data
US 2015/0240969 A1    Aug. 27, 2015

Related U.S. Application Data (60) Provisional application No. 61/944,382, filed on Feb. 25, 2014.

(51) Int. Cl.
*F16K 39/02*    (2006.01)
*F16K 31/126*    (2006.01)
*G05D 16/06*    (2006.01)

(52) U.S. Cl.
CPC ........... *F16K 39/022* (2013.01); *F16K 31/1262* (2013.01); *G05D 16/0633* (2013.01); *G05D 16/0655* (2013.01)

(58) Field of Classification Search
CPC .............. F16K 39/022; F16K 31/1262; G05D 16/0633; G05D 16/0655
USPC ................ 251/282, 331, 335.2, 284, 61, 61.2
See application file for complete search history.

(56) References Cited

U.S. PATENT DOCUMENTS

| 2,495,087 A | * | 1/1950 | Berkholder | .......... G05D 23/275 |
| | | | | 251/335.2 |
| 2,563,138 A | * | 8/1951 | Smith | ..................... F02B 1/800 |
| | | | | 251/335.2 |

(Continued)

FOREIGN PATENT DOCUMENTS

| DE | 2649254 A1 | 5/1978 |
| FR | 1479053 A | 4/1967 |

(Continued)

OTHER PUBLICATIONS

International Search Report and Written Opinion of PCT/US2015/017422 dated May 15, 2015, 13 pgs.

*Primary Examiner* — John Bastianelli
(74) *Attorney, Agent, or Firm* — Marshall, Gerstein & Borun LLP (57) ABSTRACT

A fluid regulator includes an actuator, a body assembly, and a balancing system disposed between the actuator assembly and the body assembly. The actuator assembly includes an upper casing, a lower casing secured to the upper casing, and a diaphragm assembly disposed between the upper and lower casings. The body assembly includes a stem assembly operatively connected to the diaphragm assembly to move with the diaphragm assembly. The balancing system includes a diaphragm operatively connected to the stem assembly to move with the stem assembly. The lower casing of the actuator assembly includes a wall defining a portion of a balancing cavity that receives the balancing system and an inner surface that ends at a shoulder and has an annular groove formed therein that receives a portion of the diaphragm as the fluid regulator moves from a fully open position to a lockup position.

14 Claims, 4 Drawing Sheets

(56) References Cited

U.S. PATENT DOCUMENTS

| | | | |
|---|---|---|---|
| 2,684,829 A * | 7/1954 | McFarland, Jr. | F16K 7/126 251/331 |
| 3,115,068 A | 12/1963 | Lofink | |
| 3,753,526 A * | 8/1973 | Johnson | G05D 23/128 251/282 |
| 5,288,052 A * | 2/1994 | Black | F16K 31/1262 251/331 |
| 5,383,646 A * | 1/1995 | Weingarten | G05D 16/163 251/331 |
| 6,102,071 A * | 8/2000 | Walton | G05D 16/0633 251/331 |

FOREIGN PATENT DOCUMENTS

| | | |
|---|---|---|
| JP | S60215219 A | 10/1985 |
| WO | WO-2009019279 A2 | 2/2009 |

* cited by examiner

FLUID REGULATOR WITH BALANCING SYSTEM

CROSS-REFERENCE TO RELATED APPLICATIONS

This application claims priority to U.S. Provisional Patent Application No. 61/944,382, entitled "Fluid Regulator with Balancing System" and filed on Feb. 25, 2014, the entire disclosure of which is hereby incorporated by reference herein.

FIELD OF THE DISCLOSURE

This disclosure relates generally to fluid regulators and, more specifically, to direct-operated fluid regulators with balancing diaphragms.

BACKGROUND

The pressure at which typical fluid distribution systems supply fluid may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, fluid regulators are implemented in these distribution systems in order to ensure that the delivered gas meets the requirements of the end-user facilities.

Direct-operated fluid regulators are primarily designed for industrial and commercial applications supplying fluids, such as natural gas and propane, to furnaces, burners, and other appliances and are generally well known in the art. Fluid regulators are typically used to regulate the pressure of a fluid to a substantially constant value. Specifically, a fluid regulator has an inlet that typically receives a supply fluid at a relatively high pressure and provides a relatively lower and substantially constant pressure at an outlet. To regulate the downstream pressure, fluid regulators commonly include a sensing element or diaphragm to sense an outlet pressure in fluid communication with a downstream pressure. Fluid regulators can also include balancing systems that can be used to counteract the force applied to the top of a valve disk by the higher pressure inlet fluid and possible also the force applied to a bottom of the valve disk by exhaust fluid that passes around the valve disk.

BRIEF SUMMARY OF THE DISCLOSURE

In accordance with one exemplary aspect of the present invention, a fluid regulator comprises an actuator assembly, a body assembly secured to the actuator assembly, and a balancing system disposed between the actuator assembly and the body assembly. The actuator assembly comprises an upper casing, a lower casing secured to the upper casing, and a diaphragm assembly disposed between the upper casing and the lower casing. The body assembly comprises a stem assembly operatively connected to the diaphragm assembly to move with the diaphragm assembly. The balancing system comprises a diaphragm operatively connected to the stem assembly to move with the stem assembly. The lower casing of the actuator assembly includes a wall defining a portion of a balancing cavity that receives the balancing system and an inner surface that ends at a shoulder and the wall has an annular groove formed in an inner surface of the wall that receives a portion of the diaphragm of the balancing system as the fluid regulator moves from a fully open position to a lockup position.

In accordance with another exemplary aspect of the present invention, a fluid regulator comprises an actuator assembly, a body assembly secured to the actuator assembly, and a balancing system disposed between the actuator assembly and the body assembly. The actuator assembly comprises an upper casing, a lower casing secured to the upper casing, and a diaphragm assembly disposed between the upper casing and the lower casing. The body assembly defines an inlet for an operating fluid and an outlet for the operating fluid and comprises a stem assembly operatively connected to the diaphragm assembly to move with the diaphragm assembly. The balancing system comprising a diaphragm operatively connected to the stem assembly to move with the stem assembly, the diaphragm having a cross-sectional area that is acted on by an inlet pressure of the operating fluid at the inlet of the body assembly. The fluid regulator also comprises a means for increasing the cross-sectional area of the diaphragm of the balancing assembly as the fluid regulator approaches a lockup position.

In accordance with another exemplary aspect of the present invention, a fluid regulator comprises an actuator assembly, a body assembly secured to the actuator assembly, and a balancing system disposed between the actuator assembly and the body assembly. The actuator assembly comprises an upper casing, a lower casing secured to the upper casing, and a diaphragm assembly disposed between the upper casing and the lower casing. The body assembly defines an inlet for an operating fluid and an outlet for the operating fluid and comprises a stem assembly operatively connected to the diaphragm assembly to move with the diaphragm assembly. The balancing system comprising a diaphragm operatively connected to the stem assembly to move with the stem assembly, the diaphragm having a cross-sectional area that is acted on by an inlet pressure of the operating fluid at the inlet of the body assembly. The fluid regulator also comprises a means for increasing the cross-sectional area of the diaphragm of the balancing assembly at a first rate as the fluid regulator moves away from the fully open position.

In further accordance with any one or more of the foregoing exemplary aspects of the present invention, a fluid regulator may further include, in any combination, any one or more of the following preferred forms.

In one preferred form, the annular groove is offset from the shoulder such that the portion of the diaphragm of the balancing system expands into the annular groove as the fluid regulator approaches the lockup position.

In another preferred form, a radial distance between the inner surface of the wall and a diaphragm plate of the balancing system is constant between the shoulder and the annular groove.

In another preferred form, the annular groove comprises a wall that extends from the inner surface of the wall of the lower casing at a predetermined angle from the inner surface.

In another preferred form, the predetermined angle is between 45 degrees and 70 degrees.

In another preferred form, the predetermined angle is between 55 degrees and 65 degrees.

In another preferred form, the annular groove is adjacent the shoulder such that the portion of the diaphragm of the balancing system expands into the annular groove as the fluid regulator moves from the fully open position toward the lockup position.

In another preferred form, the annular groove comprises a wall that extends that extends from the shoulder of the inner surface at a predetermined angle from the inner surface.

In another preferred form, a radial distance between the wall of the annular groove and a diaphragm plate of the balancing system increases as a distance from the shoulder increases.

In another preferred form, the predetermined angle is between 5 degrees and 20 degrees.

In another preferred form, the annular groove comprises a second wall that extends from the wall of the annular groove at a second predetermined angle from the inner surface.

In another preferred form, the second wall of the annular groove is offset from the shoulder such that the portion of the diaphragm of the balancing system is adjacent the second wall as the fluid regulator approaches the lockup position.

In another preferred form, the second predetermined angle is between 45 degrees and 70 degrees.

In another preferred form, the second predetermined angle is between 55 degrees and 65 degrees.

In another preferred form, the cross-sectional area of the diaphragm that is acted on by the inlet pressure of the operating fluid at the inlet of the body assembly is constant with the fluid regulator in a fully open position until the fluid regulator approaches the lockup position.

In another preferred form, the fluid regulator further comprises a means for increasing the cross-sectional area of the diaphragm of the balancing assembly at a second rate as the fluid regulator approaches a lockup position.

In another preferred form, the second rate is greater than the first rate.

DETAILED DESCRIPTION

Figure 1A:
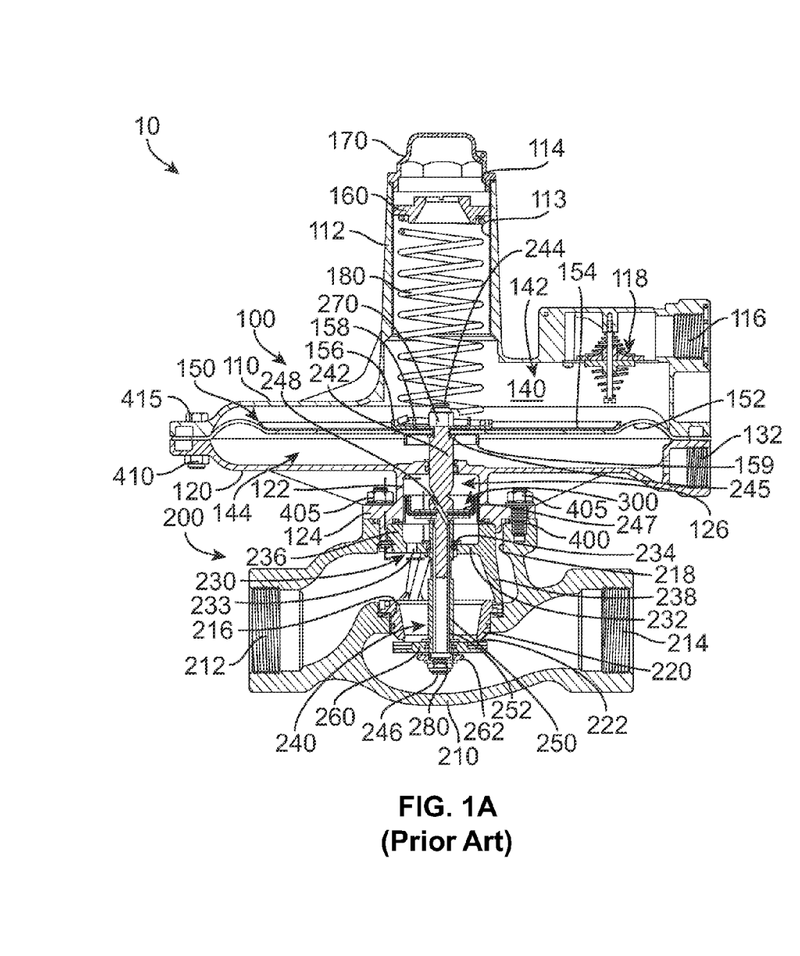
FIG. 1A is a front cross-sectional view of a known fluid regulator with a balancing system.
Figure 1B:
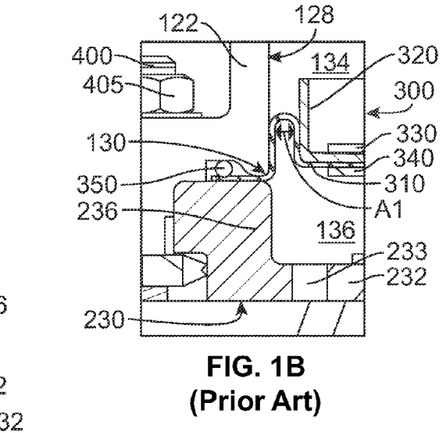
FIG. 1B is an enlarged partial view of a portion of the balancing system shown in FIG. 1A with the fluid regulator in a lockup position.
Figure 1C:
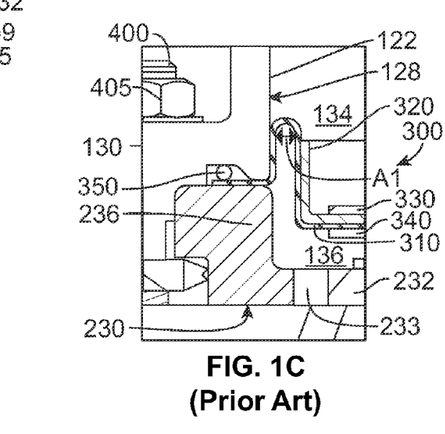
FIG. 1C is an enlarged partial view of a portion of the balancing system shown in FIG. 1A with the fluid regulator in a fully open position.

Referring to FIGS. 1A-1C, some known fluid regulators 10 generally include an actuator assembly 100 and a body assembly 200, which can be secured to actuator assembly 100 with threaded studs 400 and locknuts 405, or by any other well-known means. In addition, in the example shown, fluid regulator 10 also includes a balancing system 300 disposed between actuator assembly 100 and body assembly 200, as described in more detail below.

Actuator assembly 100 has an upper casing 110 secured to a lower casing 120 with nuts 410 and bolts 415, or any other well-known means, which when assembled define a cavity 140. A diaphragm assembly 150, as described in more detail below, is secured between upper casing 110 and lower casing 120 to divide cavity 140 into an upper portion 142 above diaphragm assembly 150 and a lower portion 144 below diaphragm assembly 150.

Upper casing 110 has a cylindrical wall 112 extending therefrom that has a threaded inner surface 113 and defines and opening 114 in one end. An adjusting screw 160 is threaded into cylindrical wall 112 of upper casing 110 and a closing cap 170 is threaded into the opening 114 of cylindrical wall 112 to protect adjusting screw 160 and prevent debris from entering actuator assembly 100. A spring 180 is disposed in upper portion 142 of cavity 140 between adjusting screw 160 and diaphragm assembly 150 to bias diaphragm assembly 150 toward body assembly 200. Another opening 116 is also formed in upper casing 110 to fluidly couple upper portion 142 of cavity 140 with the atmosphere. In the particular example shown, a stabilizer assembly 118, which are well-known in the art, is disposed proximate opening 114 to control the flow of fluid into and out of upper portion 142 of cavity 140 through opening 114.

Lower casing 120 has a wall 122 extending therefrom that has a cylindrical inner surface 128 that ends at a shoulder 130 and defines a portion of balancing cavity 126. A flange 124 extends outward from wall 122 and has apertures to receive threaded studs 400. A threaded opening 132 is also formed in lower casing 120 and can be used to connect lower casing 120 to an external control line (not shown), which can be used to fluidly couple lower portion 144 of cavity 140 and a downstream pipe, as discussed in more detail below.

Diaphragm assembly 150 generally includes a diaphragm 152, diaphragm plate 154, spring seat 156, and top and bottom sealing washers 158, 159. Diaphragm 152 is secured at its outer edge between upper casing 110 and lower casing 120 and has an opening formed in the center to receive stem 242 of stem assembly 240. Diaphragm plate 154 is positioned adjacent diaphragm 152 to provide support to the inner portion of diaphragm 152 and spring seat 156 is positioned adjacent diaphragm plate 154 to receive one end of spring 180. Top and bottom sealing washers 158, 159 are positioned on opposite sides of diaphragm 152 to secure diaphragm 152 and diaphragm plate 154 to stem 242, as described in more detail below, and to provide a seal to prevent fluid flow between upper portion 142 and lower portion 144 of cavity 140 through the opening in diaphragm 152.

Body assembly 200 generally includes a body 210, seat insert 220, cage 230 and stem assembly 240. Body 210 defines a fluid inlet 212, a fluid outlet 214, and a fluid passage 216 fluidly connecting inlet 212 and outlet 214. An opening 218 is formed body 210 and is in fluid communication with inlet 212 and aligned with fluid passage 216. Seat insert 220 is secured in fluid passage 216 and provides a sealing surface 222 that engages valve disk 260 of stem assembly 240 when regulator 10 is in a lockup position. Cage 230 is positioned in opening 218 and has a top wall 232, a generally cylindrical side wall 236 that extends from one side of top wall 232 and defines a second portion of cylindrical balancing cavity 126, and a plurality of support legs 238 that extend from another side of top wall 232, opposite side wall 236, to support cage 230 on body 210. An aperture 234 is formed through a central portion of top wall 232 to receive sleeve 250 of stem assembly 240 and one or more registration holes 233 are also formed through top wall 232 to provide fluid communication through top wall 232, as discussed in more detail below.

Stem assembly 240 generally includes a stem 242, sleeve 250, valve disk 260, and registration disk 262. Stem 242 is a generally cylindrical rod that extends through an aperture in lower casing 120 and has a first threaded end 244 that extends through openings in bottom sealing washer 159, diaphragm 152, diaphragm plate 154, spring seat 156, and top sealing washer 158. Bottom sealing washer 159 engages a shoulder 245 formed on stem 242 and a nut 270 is threaded onto first threaded end 244 to compress bottom sealing washer 159, diaphragm 152, diaphragm plate 154, spring seat 156, and top sealing washer 158 between shoulder 245 and nut 270 and secure diaphragm assembly 150 to stem assembly 240. Sleeve 250 is positioned over a portion of stem 242 to provide an annular space 252 between stem 242 and sleeve 250 from a bottom end of sleeve 250 to an area proximate a hole 248 formed through stem 242 and extends through aperture 234 in cage 230. Valve disk 260 is positioned over and end of sleeve 250 and registration disk is positioned over a second threaded end 246 of stem 242, adjacent valve disk 260. Valve disk 260 and registration disk 262 are secured to stem 242 and sleeve 250 by nut 280. At least one groove (not shown) is formed in registration disk 262 to provide fluid communication between outlet 214 and annular space 252, as described in more detail below.

Balancing system 300 includes a diaphragm 310, diaphragm plate 320, upper washer 330, and lower washer 340. Diaphragm 310 is secured at its outer edge between wall 122 of lower casing 120 and side wall 236 of cage 230 to divide balancing cavity 126 into and upper portion 134 above diaphragm 310 and a lower portion 136 below diaphragm 310 and has an opening formed in the center to receive stem 242 of stem assembly 240. An O-ring 350 can also be positioned between wall 122 and side wall 236 to help secure diaphragm 310 and to prevent the flow of fluid between wall 122, diaphragm 310, and side wall 236. Diaphragm plate 320 is positioned adjacent diaphragm 310 to provide support to the inner portion of diaphragm 310 and upper and lower washers 330, 340 are positioned on opposite sides of diaphragm 310 to secure diaphragm 310 and diaphragm plate 320 to stem 252. Diaphragm 310, diaphragm plate 320, and upper and lower washers 330, 340 are compressed between a second shoulder 247 formed in stem 242 and an end of sleeve 250 to operatively connect balancing system 300 and stem assembly 240.

In operation, when the valve disk 260 is in an open position the operating fluid enters body 210 through inlet 212 at an inlet pressure and flows through seat insert 220, past valve disk 260, and exits body 210 through outlet 214 at a downstream pressure. A portion of the operating fluid at downstream pressure P2 flows through the external control line (now shown) and is communicated to lower portion 144 of cavity 140 through opening 132 in lower casing 120. Increased demand for the operating fluid at outlet 214 will cause the downstream pressure to decrease, which will decrease the pressure in lower portion 144 of cavity 140, and the upward pressure exerted on diaphragm 152, and allow spring 180 to move diaphragm 152 and stem assembly 240 downward, which will open valve disk 260 further and supply more operating fluid to the system to meet the increased demand. Decreased demand for the operating fluid at outlet 214 will cause the downstream pressure to increase, which will increase the pressure in lower portion 144 of cavity 140, and the upward pressure exerted on diaphragm 152, and move diaphragm 152 and stem assembly 240 upward, which will close valve disk 260 further to decrease the supply of the operating fluid to the system to meet the decreased demand.

When regulator 10 is operating at steady-state conditions, the stabilizers of stabilizer assembly 118 are closed and only a small hole is open to stabilize normal operation. When regulator 10 responds to an increase in downstream pressure, the pressure in lower portion 144 of cavity 140 increases and diaphragm 152 moves upward. As diaphragm 152 moves upward, movement of air in upper portion 142 of cavity 140 can force a lower vent stabilizer of stabilizer assembly 118 upward, which allows the air in upper portion 142 of cavity 140 to vent to the atmosphere rapidly and minimize any lag in movement of diaphragm 152. When regulator 10 responds to a decrease in downstream pressure, the pressure in lower portion 144 decreases and diaphragm 152 moves downward. As diaphragm 152 moves downward, air rushes through stabilizer assembly 118 to fill the partial vacuum created in upper portion 142 of cavity 140, which forces an upper vent stabilizer of stabilizer assembly 118 to close. Air flowing through webs of the upper vent stabilizer can then open the lower vent stabilizer to allow air from the atmosphere to flow into upper portion 142 of cavity 140.

When valve disk 260 is open, the operating fluid flows from inlet 212, through seat insert 220, and over the edge of valve disk 260 to outlet 214. As the operating fluid flows through seat insert 220 and over the edge of valve disk 260 it will exert a force on the top of valve disk 260, which can interfere with the operation of regulator 10 by counteracting the upward force applied by the outlet pressure on diaphragm 152. To minimize the effect of the force exerted on the top of valve disk 260, the operating fluid from inlet 212 will also flow through registration holes 233 in cage 230 into lower portion 136 of balancing cavity 126 and exert an upward force on the bottom of diaphragm 310 of balancing system 300, which will counteract the force exerted on the top of valve disk 260 and balance the upward and downward forces ultimately exerted on stem assembly 240.

In addition to the operating fluid from inlet 212 acting on the top of valve disk 260, there will also be operating fluid that has already passed valve disk 260 exerting an upward force on the bottom of valve disk 260. The pressure of the operating fluid directly underneath valve disk 260 will be higher than the outlet pressure at outlet 214, since the velocity of the operating fluid at outlet 214 tends to lower the pressure. This upward force on the bottom of valve disk 260 can also interfere with the operation of regulator 260. To minimize the effect of the force exerted on the bottom of valve disk 260, operating fluid from the area below valve disk 260 can flow through slots (not shown) in registration disk 262, through annular space 252 between stem 242 and sleeve 250, through hole 248 in stem 242, into upper portion 134 of balancing cavity 126 and exert a downward force on the top of diaphragm 310 of balancing system 300, which will counteract the force exerted on the bottom of valve disk 260 and balance the upward and downward forces ultimately exerted on stem assembly 240. The pressure registered on the top of diaphragm 310 aids in downward travel of valve disk 260 and compensates for spring and diaphragm effect, which improves regulator range ability and performance.

In the regulator 10 shown in FIGS. 1A-1C, as the inlet pressure increases, the pressure exerted on the top of valve disk 260 also increases, which produces a higher outlet pressure and droop. However, the increase in the inlet pressure will also exert a greater pressure on the bottom of diaphragm 310 of balancing system 300, thereby counteracting the force exerted on the top of valve disk 260. Thus, regulator 10 will maintain its performance with minimum impact from inlet pressure variation. As can best be seen in FIGS. 1B and 1C, inner surface 128 of wall 122 is cylindrical and has a constant radius and the distance between inner surface 128 and diaphragm plate 320 is constant regardless of the position of the stem assembly 240. Therefore, the cross-sectional area A1 of diaphragm 310 that is acted on by the inlet pressure stays constant from the lockup (fully closed) position (FIG. 1B) through the fully open position (FIG. 1C). Thus, the force exerted on diaphragm 310 will be constant throughout the full range of motion of stem assembly 240 and should balance the force exerted on the top of valve disk 260 regardless of the position of stem assembly 240.

Figure 2A:
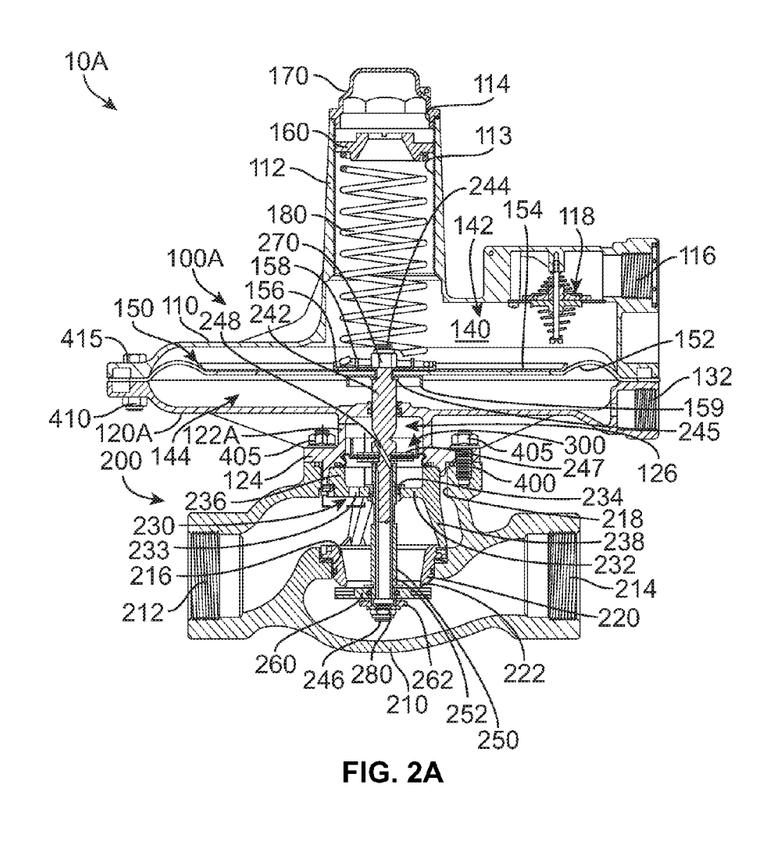
FIG. 2A is a front cross-section view of an example fluid regulator with a balancing system.
Figure 2B:
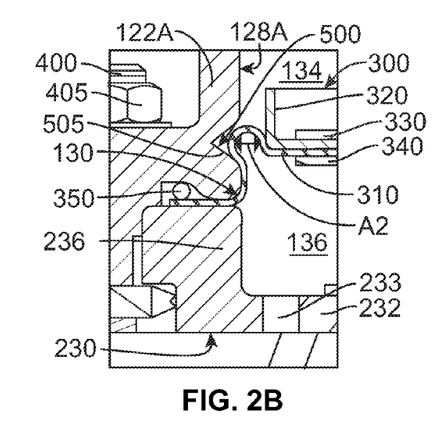
FIG. 2B is an enlarged partial view of a portion of the balancing system shown in FIG. 2A with the fluid regulator in a lockup position.
Figure 2C:
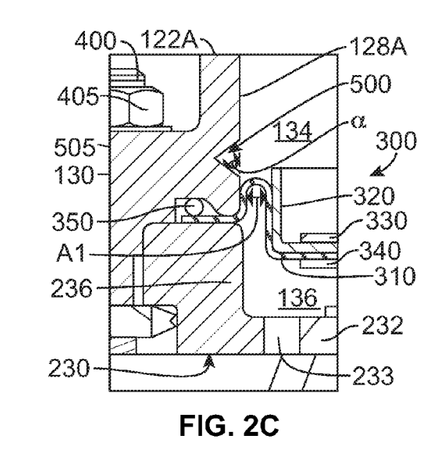
FIG. 2C is an enlarged partial view of a portion of the balancing system shown in FIG. 2A with the fluid regulator in a fully open position.

Referring to FIGS. 2A-2C, an example regulator 10A is shown that can lower the lockup value when regulator 10A is in a lockup or fully closed position. Regulator 10A is identical in structure and function to regulator 10 shown in FIGS. 1A-1C and described in detail above except for the design of lower casing 120A and the function of balancing system 300, the differences in which are described in detail below.

In regulator 10A, the wall 122A of lower casing 120A has a generally cylindrical inner surface 128A, similar to wall 122 of regulator 10, except that wall 122A has an annular groove 500 formed therein. Annular groove 500 is offset from shoulder 130 such that diaphragm 310 can expand into annular groove 500 as regulator 10A approaches the lockup position, as shown in FIG. 2B and discussed in more detail below. As best shown in FIG. 2C, a wall 505 of annular groove 500 extends outward, away from inner surface 128A, at a predetermined angle α from inner surface 128A. In the example shown, annular groove 500 has a triangular shape and angle α is approximately 55-65 degrees. However, the shape of annular groove 500 could be any desired shape and angle α could be any angle that allows diaphragm 310 to expand quickly into annular groove 500 as regulator 10A approaches the lockup position. For example, annular groove 500 could have a rectangular shape, an octagonal shape, or a semi-circular shape where wall 505 extends from inner surface 128A at an angle α of approximately 90 degrees. Angle α can be any angle that allows diaphragm 310 to expand into annular groove 500 quickly and still provide some lateral support of diaphragm 310 and is preferably between 45-70 degrees.

Just as discussed above for regulator 10, when the valve disk 260 of regulator 10A is in an open position the operating fluid enters body 210 through inlet 212 at an inlet pressure and flows through seat insert 220, past valve disk 260, and exits body 210 through outlet 214 at a downstream pressure. A portion of the operating fluid at downstream pressure P2 flows through the external control line (now shown) and is communicated to lower portion 144 of cavity 140 through opening 132 in lower casing 120A such that increased demand for the operating fluid will open valve disk 260 further and supply more operating fluid to the system to meet the increased demand and decreased demand for the operating fluid at outlet 214 will close valve disk 260 further to decrease the supply of the operating fluid to the system to meet the decreased demand. Stabilizer assembly 118 of regulator 10A will also operate to vent an fill upper portion 142 of cavity 140 as discussed above for regulator 10.

When valve disk 260 is open, operating fluid flowing through seat insert 220 will exert a force on the top of valve disk 260, which can interfere with the operation of regulator 10A by counteracting the upward force applied by the outlet pressure on diaphragm 152. To minimize the effect of the force exerted on the top of valve disk 260, the operating fluid from inlet 212 will also flow through registration holes 233 in cage 230 into lower portion 136 of balancing cavity 126 and exert an upward force on the bottom of diaphragm 310 of balancing system 300, which will counteract the force exerted on the top of valve disk 260.

In addition to the operating fluid from inlet 212 acting on the top of valve disk 260, operating fluid that has already passed valve disk 260 will exert an upward force on the bottom of valve disk 260, which can also interfere with the operation of regulator 260. To minimize the effect of the force exerted on the bottom of valve disk 260, operating fluid from the area below valve disk 260 can flow through slots (not shown) in registration disk 262, through annular space 252 between stem 242 and sleeve 250, through hole 248 in stem 242, into upper portion 134 of balancing cavity 126 and exert a downward force on the top of diaphragm 310 of balancing system 300, which will counteract the force exerted on the bottom of valve disk 260.

In the regulator 10A shown in FIGS. 2A-2C, when not in the lockup position, as the inlet pressure increases, the pressure exerted on the top of valve disk 260 also increases, which produces a higher outlet pressure and droop. However, the increase in the inlet pressure will also exert a greater force on the bottom of diaphragm 310 of balancing system 300, thereby counteracting the force exerted on the top of valve disk 260. Thus, regulator 10A will maintain its performance with minimum impact from inlet pressure variation. As can best be seen in FIGS. 2B and 2C, inner surface 128A of wall 122A is cylindrical and the distance between inner surface 128A and diaphragm plate 320 is constant between shoulder 130 and the beginning of annular groove 500. Therefore, the cross-sectional area A1 of diaphragm 310 that is acted on by the inlet pressure stays constant from the fully open position (FIG. 1C) until regulator 10A approaches the lockup position. Thus, the force exerted on diaphragm 310 will be constant throughout these positions and should balance the force exerted on the top of valve disk 260. Unlike regulator 10, as regulator 10A approaches the lockup position, diaphragm 310 will expand into annular groove 500, which result in an increased cross-sectional area A2 of diaphragm 310. As the inlet pressure acts on the increased cross-sectional area A2 of diaphragm 310, a greater force will be exerted on the bottom of diaphragm 310 due to the increases cross-sectional area, which reduces the downstream pressure required to act on diaphragm 152 to achieve and maintain the lockup position and lowers the lockup value.

Figure 3A:
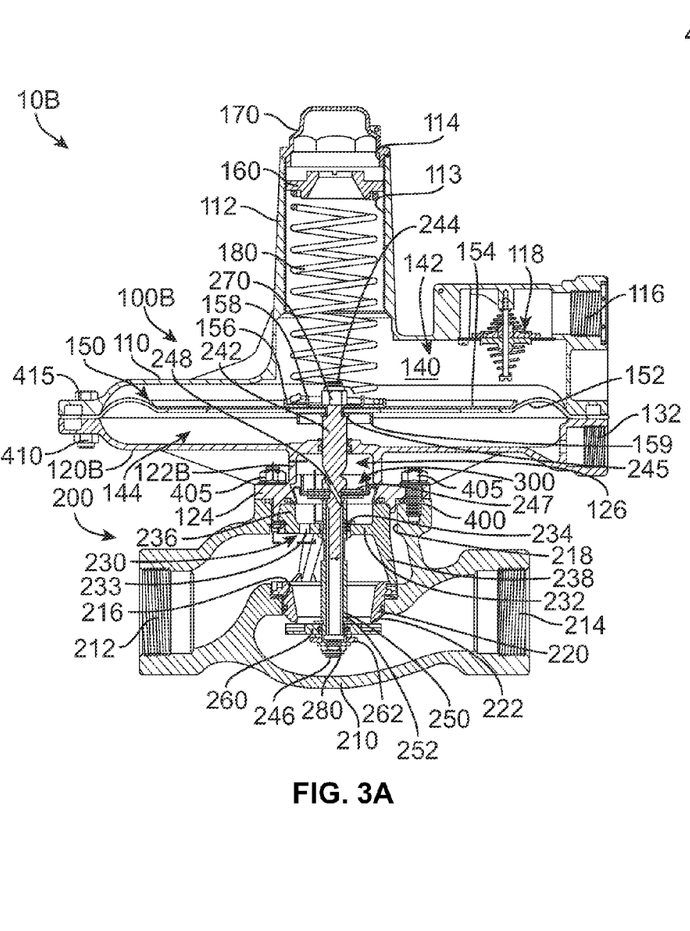
FIG. 3A is a front cross-section view of another example fluid regulator with a balancing system.
Figure 3B:
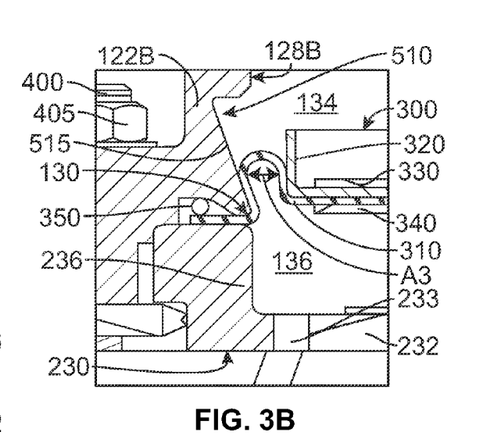
FIG. 3B is an enlarged partial view of a portion of the balancing system shown in FIG. 3A with the fluid regulator in a lockup position.
Figure 3C:
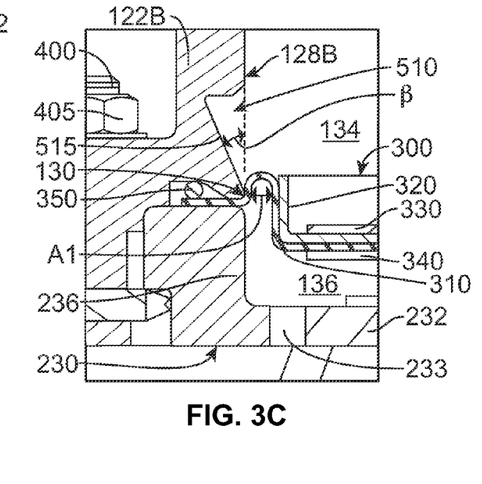
FIG. 3C is an enlarged partial view of a portion of the balancing system shown in FIG. 3A with the fluid regulator in a fully open position.

Referring to FIGS. 3A-3C, an example regulator 10B is shown that can improve the flow performance of the regulator. Regulator 10B is identical in structure and function to regulator 10 shown in FIGS. 1A-1C and described above except for the design of lower casing 120B and the function of balancing system 300, the differences in which are described in detail below.

In regulator 10B, the wall 122B of lower casing 120B has a generally cylindrical inner surface 128B, similar to wall 122 of regulator 10, except that wall 122B has an annular groove 510 formed therein. Annular groove 510 has a wall 515 that is adjacent shoulder 130 such that diaphragm 310 can expand into annular groove 510 as regulator 10B moves from the fully open position (FIG. 3C) to the lockup position (FIG. 3B). As best shown in FIG. 3C, wall 515 of annular groove 510 extends outward, away from shoulder 130, at a predetermined angle β from inner surface 128B. In the example shown, angle β is approximately 20 degrees, however, angle β could be any angle, preferably between 5-20 degrees, depending on the application, that allows diaphragm 310 to expand slowly into annular groove 510 as regulator 10B moves from the fully open position (FIG. 3C) to the lockup position (FIG. 3B).

Just as discussed above for regulator 10, when the valve disk 260 of regulator 10B is in an open position the operating fluid enters body 210 through inlet 212 at an inlet pressure and flows through seat insert 220, past valve disk 260, and exits body 210 through outlet 214 at a downstream pressure. A portion of the operating fluid at downstream pressure P2 flows through the external control line (now shown) and is communicated to lower portion 144 of cavity 140 through opening 132 in lower casing 120A such that increased demand for the operating fluid will open valve disk 260 further and supply more operating fluid to the system to meet the increased demand and decreased demand for the operating fluid at outlet 214 will close valve disk 260 further to decrease the supply of the operating fluid to the system to meet the decreased demand. Stabilizer assembly 118 of regulator 10B will also operate to vent an fill upper portion 142 of cavity 140 as discussed above for regulator 10.

When valve disk 260 is open, operating fluid flowing through seat insert 220 will exert a force on the top of valve disk 260. To minimize the effect of the force exerted on the top of valve disk 260, the operating fluid from inlet 212 will also flow through registration holes 233 in cage 230 into lower portion 136 of balancing cavity 126 and exert an upward force on the bottom of diaphragm 310 of balancing system 300, which will counteract the force exerted on the top of valve disk 260.

In addition to the operating fluid from inlet 212 acting on the top of valve disk 260, operating fluid that has already passed valve disk 260 will exert an upward force on the bottom of valve disk 260. To minimize the effect of the force exerted on the bottom of valve disk 260, operating fluid from the area below valve disk 260 can flow through slots (not shown) in registration disk 262, through annular space 252 between stem 242 and sleeve 250, through hole 248 in stem 242, into upper portion 134 of balancing cavity 126 and exert a downward force on the top of diaphragm 310 of balancing system 300, which will counteract the force exerted on the bottom of valve disk 260.

In the regulator 10B shown in FIGS. 3A-3C, when not in the lockup position, as the inlet pressure increases, the pressure exerted on the top of valve disk 260 also increases, which produces a higher outlet pressure and droop. However, the increase in the inlet pressure will also exert a greater force on the bottom of diaphragm 310 of balancing system 300, thereby counteracting the force exerted on the top of valve disk 260. Thus, regulator 10B will maintain its performance with minimum impact from inlet pressure variation. As can best be seen in FIGS. 3B and 3C, wall 515 of annular groove 510 starts at shoulder 130 and extends at an angle β and the distance between wall 515 and diaphragm plate 320 will slowly increase as regulator 10B moves from the fully open position (FIG. 3C) to the lockup position (FIG. 3B). Therefore, unlike regulator 10, the cross-sectional area A3 of diaphragm 310 in regulator 10B that is acted on by the inlet pressure will slowly increase as stem assembly 240 moves upward (i.e., regulator 10B moves from the fully open position (FIG. 3C) towards the lockup position (FIG. 3B)) and will slowly decrease as stem assembly 240 moves downward (i.e., regulator 10B moves from the lockup position towards the fully open position). Thus, the force exerted on diaphragm 310 will slowly increase as regulator 10B moves toward the lockup position and slowly decrease as regulator 10B moves toward the fully open position. Therefore, as regulator 10B moves from the lockup position to the fully open position the upward force acting on diaphragm 310 will decrease due to the decrease in cross-sectional area A3, which in turn allows a high downstream pressure during travel of valve disk 260 and improves the flow capacity and performance of regulator 10B.

Figure 4A:
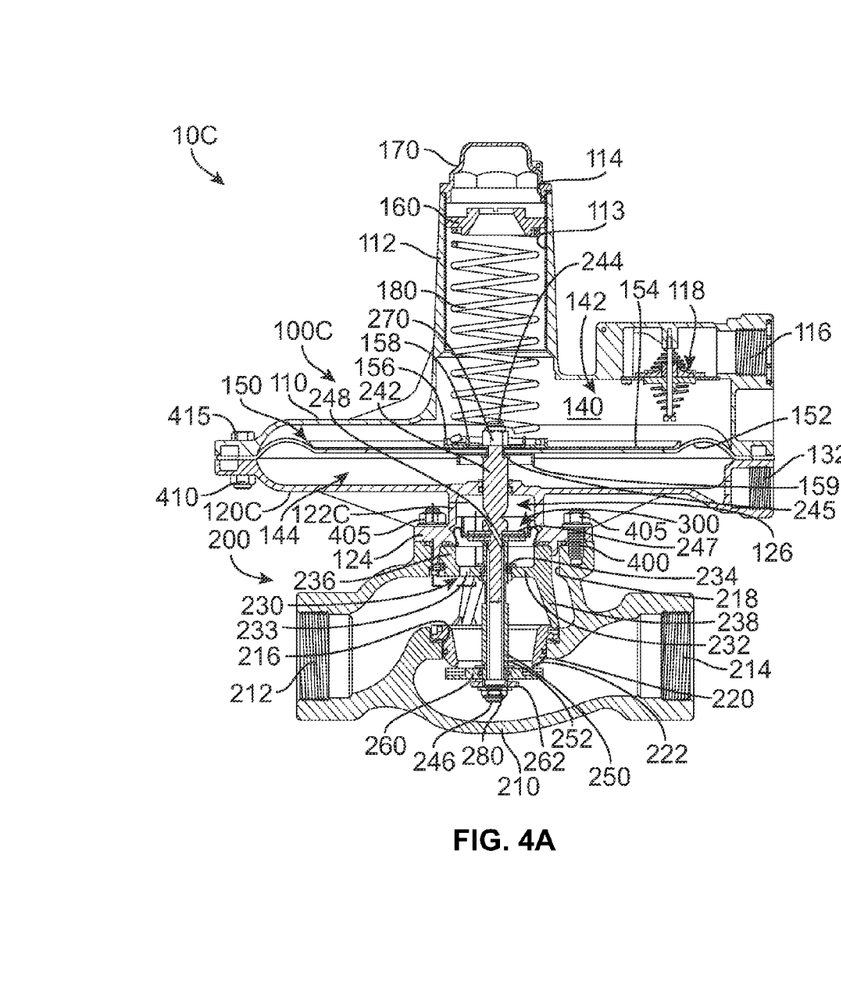
FIG. 4A is a front cross-section view of yet another example fluid regulator with a balancing system.
Figure 4B:
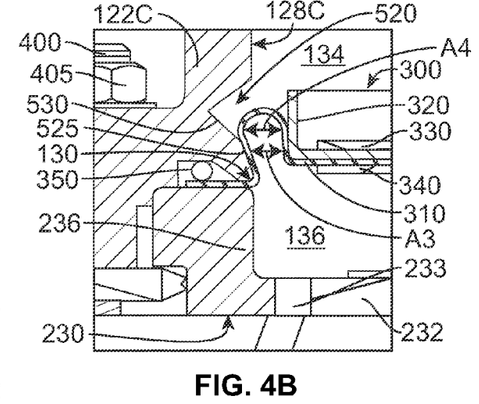
FIG. 4B is an enlarged partial view of a portion of the balancing system shown in FIG. 4A with the fluid regulator in a lockup position.
Figure 4C:
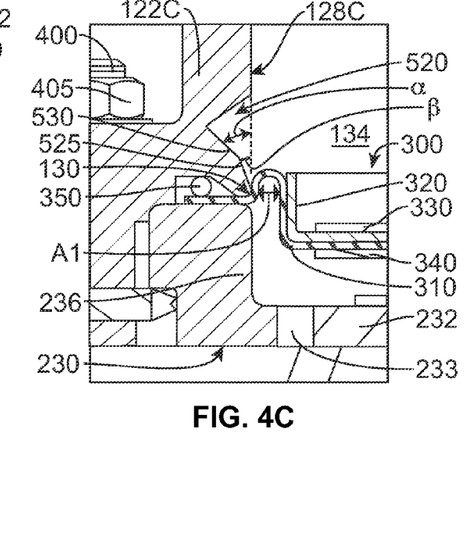
FIG. 4C is an enlarged partial view of a portion of the balancing system shown in FIG. 4A with the fluid regulator in a fully open position.

Referring to FIGS. 4A-4C, an example regulator 10C is shown that can improve the flow performance of the regulator and lower the lockup value when regulator 10C is in a lockup or fully closed position. Regulator 10C is identical in structure and function to regulator 10 shown in FIGS. 1A-1C and described above except for the design of lower casing 120C and the function of balancing system 300, the differences in which are described in detail below.

In regulator 10C, the wall 122C of lower casing 120C has a generally cylindrical inner surface 128C, similar to wall 122 of regulator 10, except that wall 122C has an annular groove 520 formed therein. Annular groove 520 has a first wall 525, similar to wall 515 of annular groove 510 in FIGS. 3A-3C, and a second wall 530, similar to wall 505 of annular groove 510 in FIGS. 2A-2C.

First wall 525 is adjacent shoulder 130 such that diaphragm 310 can slowly expand into annular groove 520 as regulator 10C moves from the fully open position (FIG. 4C) towards the lockup position (FIG. 4B). As best shown in FIG. 4C, first wall 525 of annular groove 520 extends outward, away from shoulder 130, at a predetermined angle β from inner surface 128C. In the example shown, angle β is approximately 20 degrees, however, angle β could be any angle, preferably between 5-20 degrees, depending on the application, that allows diaphragm 310 to expand slowly into annular groove 520 as regulator 10C moves from the fully open position towards the lockup position.

Second wall 530 is offset from shoulder 130 such that diaphragm 310 can quickly expand past first wall 525 and further into annular groove 500 as regulator 10C approaches the lockup position, as shown in FIG. 4B and discussed in more detail below. As best shown in FIG. 4C, second wall 530 extends outward, away from first wall 525, at a predetermined angle α from inner surface 128C. In the example shown, the portion of annular groove 520 formed by second wall 530 has a triangular shape and angle α is approximately 55-65 degrees. However, the shape of annular groove 520 formed by second wall 530 could be any desired shape and angle α could be any angle that allows diaphragm 310 to expand quickly past first wall 525 and further into annular groove 520 as regulator 10C approaches the lockup position. For example, the portion of annular groove 520 could have a rectangular shape, an octagonal shape, or a semi-circular shape where second wall 530 extends from first wall 525 at an angle α of approximately 90 degrees from inner surface 128C. Angle α can be any angle that allows diaphragm 310 to expand past first wall 525 and into annular groove 500 quickly and still provide some lateral support of diaphragm 310 and is preferably between 45-70 degrees.

Just as discussed above for regulator 10, when the valve disk 260 of regulator 10C is in an open position the operating fluid enters body 210 through inlet 212 at an inlet pressure and flows through seat insert 220, past valve disk 260, and exits body 210 through outlet 214 at a downstream pressure. A portion of the operating fluid at downstream pressure P2 flows through the external control line (now shown) and is communicated to lower portion 144 of cavity 140 through opening 132 in lower casing 120A such that increased demand for the operating fluid will open valve disk 260 further and supply more operating fluid to the system to meet the increased demand and decreased demand for the operating fluid at outlet 214 will close valve disk 260 further to decrease the supply of the operating fluid to the system to meet the decreased demand. Stabilizer assembly 118 of regulator 10B will also operate to vent an fill upper portion 142 of cavity 140 as discussed above for regulator 10.

When valve disk 260 is open, operating fluid flowing through seat insert 220 will exert a force on the top of valve disk 260. To minimize the effect of the force exerted on the top of valve disk 260, the operating fluid from inlet 212 will also flow through registration holes 233 in cage 230 into lower portion 136 of balancing cavity 126 and exert an upward force on the bottom of diaphragm 310 of balancing system 300, which will counteract the force exerted on the top of valve disk 260.

In addition to the operating fluid from inlet 212 acting on the top of valve disk 260, operating fluid that has already passed valve disk 260 will exert an upward force on the bottom of valve disk 260. To minimize the effect of the force exerted on the bottom of valve disk 260, operating fluid from the area below valve disk 260 can flow through slots (not shown) in registration disk 262, through annular space 252 between stem 242 and sleeve 250, through hole 248 in stem 242, into upper portion 134 of balancing cavity 126 and exert a downward force on the top of diaphragm 310 of balancing system 300, which will counteract the force exerted on the bottom of valve disk 260.

In the regulator 10C shown in FIGS. 4A-4C, when not in the lockup position, as the inlet pressure increases, the pressure exerted on the top of valve disk 260 also increases, which produces a higher outlet pressure and droop. However, the increase in the inlet pressure will also exert a greater force on the bottom of diaphragm 310 of balancing system 300, thereby counteracting the force exerted on the top of valve disk 260. Thus, regulator 10C will maintain its performance with minimum impact from inlet pressure variation.

As can best be seen in FIGS. 4B and 4C, first wall 525 of annular groove 520 starts at shoulder 130 and extends at an angle β and the distance between first wall 525 and diaphragm plate 320 will slowly increase as regulator 10C moves from the fully open position (FIG. 4C) to the lockup position (FIG. 4B). Therefore, unlike regulator 10, the cross-sectional area A3 of diaphragm 310 in regulator 10C that is acted on by the inlet pressure will slowly increase as stem assembly 240 moves upward (i.e., regulator 10C moves from the fully open position towards the lockup position) and will slowly decrease as stem assembly 240 moves downward (i.e., regulator 10C moves from the lockup position towards the fully open position). Thus, the force exerted on diaphragm 310 will slowly increase as regulator 10C moves toward the lockup position and slowly decrease as regulator 10C moves toward the fully open position. Therefore, as regulator 10C moves from the lockup position to the fully open position the upward force acting on diaphragm 310 will decrease due to the decrease in cross-sectional area A3, which in turn allows a high downstream pressure during travel of valve disk 260 and improves the flow capacity and performance of regulator 10C.

As regulator 10C approaches the lockup position, diaphragm 310 will pass the end of first wall 525 and quickly expand into the portion of annular groove 520 formed by second wall 530, which will result in an even larger increase in cross-sectional area A4 of diaphragm 310. As the inlet pressure acts on the increased cross-sectional area A4 of diaphragm 310, a greater force will be exerted on the bottom of diaphragm 310 due to the increase in cross-sectional area, which reduces the downstream pressure required to act on diaphragm 152 to achieve and maintain the lockup position and lowers the lockup value.

While various embodiments have been described above, this disclosure is not intended to be limited thereto. Variations can be made to the disclosed embodiments that are still within the scope of the appended claims.

What is claimed is:

1. A fluid regulator, comprising:
an actuator assembly comprising an upper casing, a lower casing secured to the upper casing, and a diaphragm assembly disposed between the upper casing and the lower casing;
a body assembly secured to the actuator assembly, the body assembly comprising a stem assembly operatively connected to the diaphragm assembly to move with the diaphragm assembly; and
a balancing system disposed between the actuator assembly and the body assembly, the balancing system comprising a second diaphragm operatively connected to the stem assembly to move with the stem assembly; wherein
the lower casing of the actuator assembly includes a wall defining a portion of a balancing cavity that receives the balancing system and an inner surface that ends at a shoulder, the wall having an annular groove formed in the inner surface of the wall that receives a portion of the second diaphragm of the balancing system as the fluid regulator moves from a fully open position to a lockup position.

2. The fluid regulator of claim 1, wherein the annular groove is offset from the shoulder such that the portion of the second diaphragm of the balancing system expands into the annular groove as the fluid regulator approaches the lockup position.

3. The fluid regulator of claim 1, wherein a radial distance between the inner surface of the wall and a diaphragm plate of the balancing system is constant between the shoulder and the annular groove.

4. The fluid regulator of claim 1, wherein the annular groove comprises a wall that extends from the inner surface of the wall of the lower casing at a predetermined angle from the inner surface.

5. The fluid regulator of claim 4, wherein the predetermined angle is between 45 degrees and 70 degrees.

6. The fluid regulator of claim 5, wherein the predetermined angle is between 55 degrees and 65 degrees.

7. The fluid regulator of claim 1, wherein the annular groove is adjacent the shoulder such that the portion of the second diaphragm of the balancing system expands into the annular groove as the fluid regulator moves from the fully open position toward the lockup position.

8. The fluid regulator of claim 1, wherein the annular groove comprises a wall that extends that extends from the shoulder of the inner surface at a predetermined angle from the inner surface.

9. The fluid regulator of claim 8, wherein a radial distance between the wall of the annular groove and a diaphragm plate of the balancing system increases as a distance from the shoulder increases.

10. The fluid regulator of claim 8, wherein the predetermined angle is between 5 degrees and 20 degrees.

11. The fluid regulator of claim 8, wherein the annular groove comprises a second wall that extends from the wall of the annular groove at a second predetermined angle from the inner surface.

12. The fluid regulator of claim 11, wherein the second wall of the annular groove is offset from the shoulder such that the portion of the second diaphragm of the balancing system is adjacent the second wall as the fluid regulator approaches the lockup position.

13. The fluid regulator of claim 11, wherein the second predetermined angle is between 45 degrees and 70 degrees.

14. The fluid regulator of claim 11, wherein the second predetermined angle is between 55 degrees and 65 degrees.

* * * * *